(12) United States Patent
Songukrishnasamy et al.

(10) Patent No.: US 8,527,099 B2
(45) Date of Patent: Sep. 3, 2013

(54) PNEUMATIC CONTROL DEVICE AND SYSTEM

(75) Inventors: Rameshbabu R. Songukrishnasamy, Bangalore (IN); Daniel Ginn, Danville, CA (US); Harry Sim, San Jose, CA (US)

(73) Assignee: Cypress Envirosystems, Inc., San Jose, CA (US)

( * ) Notice: Subject to any disclaimer, the term of this patent is extended or adjusted under 35 U.S.C. 154(b) by 518 days.

(21) Appl. No.: 12/317,347

(22) Filed: Dec. 22, 2008

(65) Prior Publication Data
US 2009/0192653 A1 Jul. 30, 2009

Related U.S. Application Data

(60) Provisional application No. 61/024,231, filed on Jan. 29, 2008.

(51) Int. Cl.
*G05D 7/00* (2006.01)
*G05D 23/00* (2006.01)

(52) U.S. Cl.
USPC ............... 700/282; 700/276; 700/301

(58) Field of Classification Search
USPC ................... 700/276, 278, 282, 301
See application file for complete search history.

(56) References Cited

U.S. PATENT DOCUMENTS

| | | | |
|---|---|---|---|
| 3,037,702 A | 5/1962 | Mauer et al. | |
| 4,610,263 A * | 9/1986 | Barnes | 137/85 |
| 4,898,200 A * | 2/1990 | Odajima et al. | 137/85 |
| 5,114,070 A | 5/1992 | Lilja et al. | |
| 5,306,116 A | 4/1994 | Gunn et al. | |
| 5,310,070 A | 5/1994 | Haas et al. | |
| 5,310,111 A | 5/1994 | Linck | |
| 5,634,590 A * | 6/1997 | Gorski et al. | 236/47 |
| 6,863,356 B2 | 3/2005 | Hackl et al. | |
| 6,889,700 B2 | 5/2005 | George | |
| 6,933,655 B2 | 8/2005 | Morrison et al. | |
| 7,161,276 B2 | 1/2007 | Face | |
| 7,256,505 B2 | 8/2007 | Arms et al. | |
| 7,260,417 B2 | 8/2007 | El-Batal et al. | |
| 7,379,800 B2 | 5/2008 | Breed | |
| 7,400,253 B2 | 7/2008 | Cohen | |
| 7,429,801 B2 | 9/2008 | Adamson et al. | |
| 7,501,726 B1 | 3/2009 | Waters et al. | |
| 7,514,804 B2 | 4/2009 | Wang | |

(Continued)

FOREIGN PATENT DOCUMENTS

WO 2008125866 A1 10/2008

OTHER PUBLICATIONS

International Search Report of the International Searching Authority for International Application PCT/US08/13977 dated Feb. 12, 2009; 2 pages.

(Continued)

*Primary Examiner* — Ryan Jarrett
(74) *Attorney, Agent, or Firm* — Manuel de la Cerra (57) ABSTRACT

A control device may include at least a first electromechanical setpoint controller having a prime mover that applies a setpoint force in response to at least a controller signal, and a controller circuit that generates at least the controller signal in response to setpoint control data. A pneumatic controller may have at least one gas flow inlet and a flow regulator that varies a gas flow property in response to the setpoint force.

17 Claims, 9 Drawing Sheets

(56) References Cited

U.S. PATENT DOCUMENTS

2005/0278074 A1* 12/2005 Junk et al. .................... 700/282
2006/0176158 A1   8/2006 Fleming
2008/0154436 A1*  6/2008 Krippner et al. ............. 700/282
2009/0192653 A1   7/2009 Songukrishnasamy et al.
2009/0302249 A1* 12/2009 Fincher ................... 251/129.04
2011/0166712 A1   7/2011 Kramer et al.

OTHER PUBLICATIONS

Written Opinion of the International Searching Authority for International Application PCT/US08/13977 dated Feb. 12, 2009; 5 pages.

U.S. Appl. No. 12/574,422 "Pneumatic Energy Harvesting Devices, Methods and Systems," Marcus Kramer et al., filed on Oct. 6, 2009; 54 pages.

USPTO Non-Final Rejection for U.S. Appl. No. 12/574,422 dated Oct. 2, 2012; 5 pages.

"Millenial Net Announces Intelligent Energy Conservation Solution for Commercial and Industriai HVAC Environments," Press Release, Jun. 9, 2008, archive found at http://news.thomasnet.com/fullstory/545609.

U.S. Appl. No. 61/024,231 "Wireless Pneumatic Thermostat," Ramestiababu Songukrishnasamy, filed on Jan. 29, 2008; 7 pages.

U.S. Appl. No. 61/103,022, "Prieurnatic Fiarvest System and Method", Oct. 6, 2008; 28 pages.

U.S. Appl. No. 61/315,355, "Wireless Pneumatic Thermostat System and Method", Mar. 18, 2010; 13 pages.

International Search Report for International Applicat on No. PCT/US08/013977, dated Dec. 22, 2008; 6 pages.

Mendler et at., "The Greening Curve—Lessons Learned in the Design of the New EPA Campus in North Caroiina," US Environmental Protection Agency, Nov. 2001, available at http://www.epa.gov/rtp/campus/environmental/thegreeningcurve-new.pdf.

USPTO Requirement for Rejection for U.S. Appl. No. 12/574,422 dated Aug. 13, 2012; 5 pages.

Written Opinion of the international Searching Authority for international Application No. PCT/US08/013977 mailed Feb. 12, 2009; 5 pages.

* cited by examiner

PNEUMATIC CONTROL DEVICE AND SYSTEM

This application claims the benefit of U.S. provisional patent application Ser. No. 61/024,231 filed on Jan. 29, 2008, the contents of which are incorporated by reference herein.

TECHNICAL FIELD

The present disclosure relates generally to pneumatic control devices and systems, and more particularly to control devices, systems, and methods for controlling, monitoring, and diagnosing pneumatic devices, and the like.

BACKGROUND

Many control devices may be pneumatic based. Pneumatic based control devices may control various systems based on a gas flow or pressure. Typically, such pneumatic control devices may include a "flapper" technology that may regulate a gas flow to thereby provide a pneumatic control signal.

One example of a pneumatic control device is a pneumatic thermostat. Pneumatic thermostats may be used as sensing and control devices for pneumatically controlled devices, such as variable air volume (VAV) units, ventilators, fan coil units, reheat coils, radiators, and the like, typically employed in a heating, ventilation, air conditioning (HVAC) system.

One type of pneumatic thermostat includes a pneumatic temperature controller, a setpoint cam, and a knob/slider. Such a pneumatic temperature controller may be a combination of a valve unit (typically a diaphragm type valve), a "flapper" controlled nozzle, and a bimetallic strip. A supply air is passed through the valve unit which controls the pressure at an outlet, after allowing a portion of the supply air to exit into the atmosphere through the flapper controlled nozzle. The outlet pressure can be used to pneumatically control another device.

Changes in a position of a flapper over the control nozzle may create corresponding changes in the amount of supply air exited to the atmosphere. This, in turn, may change the outlet air pressure.

A setpoint for such a pneumatic temperature controller may be manually set, by adjusting a cam position using a knob or slider. A cam position may change the amount of force applied by the bimetallic strip to the flapper. The position of the flapper may thus be determined by a resulting balance between by the force exerted from the portion of supply air passing through the nozzle on one side, and the force generated by the bimetallic strip on another side. A force generated by a bimetallic strip may be proportional to a difference between a setpoint and the ambient temperature for the pneumatic thermostat.

In the above arrangement, when the ambient temperature is at the setpoint, the flapper may reach an equilibrium position, creating a certain clearance above the nozzle, which in turn creates a corresponding outlet pressure. However, when the ambient temperature is away from the setpoint in one direction, the bimetallic strip exerts less force on the flapper. This may move the flapper away from the nozzle increasing a clearance between the flapper and nozzle. Such increased clearance may allow more supply air to escape to the atmosphere, reducing the outlet pressure. Conversely, when the ambient temperature is away from the setpoint in the other direction, the bimetallic strip exerts greater force on the flapper. This may move the flapper closer to the nozzle, decreasing a clearance between the flapper and nozzle. Such decreased clearance results in less supply air escaping to the atmosphere, increasing the outlet pressure.

DETAILED DESCRIPTION

Various embodiments will now be described in detail that show devices, systems and methods that include a control device that may include a non-electrical control section that may interface with legacy non-electrical control system connections. At the same time, such a control device may provide wireless control and monitoring.

Control devices described herein may be compatible with existing site connections to enable rapid replacement of legacy control devices. In very particular examples, control devices may be wireless pneumatic thermostat (WPT) devices that may replace existing manually controlled pneumatic thermostats.

In the following descriptions, apart from general reference characters ending with "00" like features are referred to with the same reference character but with a first digit corresponding to the figure.

Figure 1A:
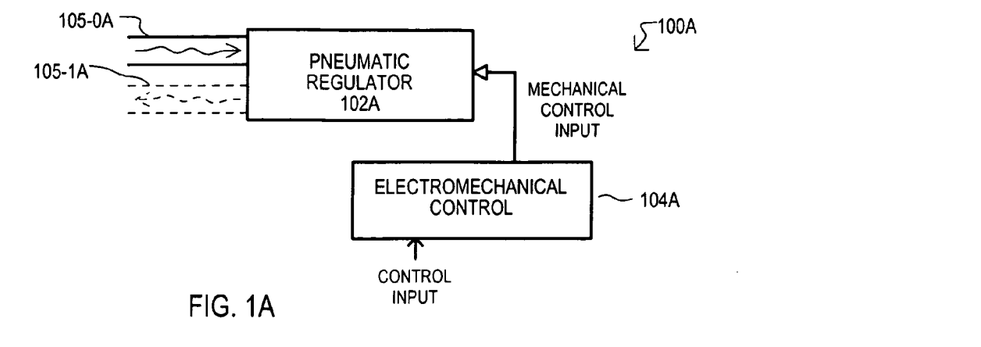
FIGS. 1A and 1B show block schematic diagrams of control devices according to embodiments.

Referring now to FIG. 1A, one example of a control device according to a first embodiment is shown in a block schematic diagram and designated by the general reference character 100A. A control device 100A may include a pneumatic regulator section 102A and an electromechanical control section 104A.

A pneumatic regulator section 102A may provide a regulatory control value based on pneumatics. For example, a pneumatic regulator section 102A may receive a gas and provide a gas pressure, or flow as a pneumatic control value. In the particular example shown, a pneumatic control section may have a gas flow inlet 105-0A that may receive a gas. In such an arrangement, a pneumatic regulator section 102A may selectively control how such a received gas is vented (e.g., to the atmosphere) to thereby generate a back pressure at gas flow inlet 105-0A that may be used as a control value for other pneumatic equipment. As but a few examples, such a pneumatic control value may regulate a temperature, a pressure, or humidity of a zone, or a flow of a gas to/from a zone.

In addition or alternatively, a pneumatic regulator section 102A may also have a gas flow outlet 105-1A. In such an arrangement, a pneumatic regulator section 102A may selectively control how much gas received at gas flow inlet 105-0A is output at gas flow outlet 105-1A. Thus, a gas flow outlet 105-1A may provide a control value for other pneumatic equipment.

Pneumatic regulator section 102A can regulate a gas flow according to a mechanical control input. A mechanical control input may be a force or position.

In particular embodiments, a pneumatic regulator section 102A does not include electric elements, such as electromechanical actuators, solenoids, etc.

An electromechanical control section 104A can provide supervisory control over pneumatic regulator section 102A by generating a mechanical control input. More particularly, an electromechanical control section 104A may receive a control input signal, and in response to such a signal, generate the mechanical control input. A control input signal may be a digital signal, thus enabling a pneumatic-to-digital conversion. As will be described in more detail below, a control input signal may be one or more values stored in the electromechanical control section 104A that have been received from a location remote to the control device 100A.

In this way, a control device may include a pneumatic control section that provides fully pneumatic regulation, as well as an electromechanical section that generates a mechanical input for supervising operation of the pneumatic control section.

Figure 1B:
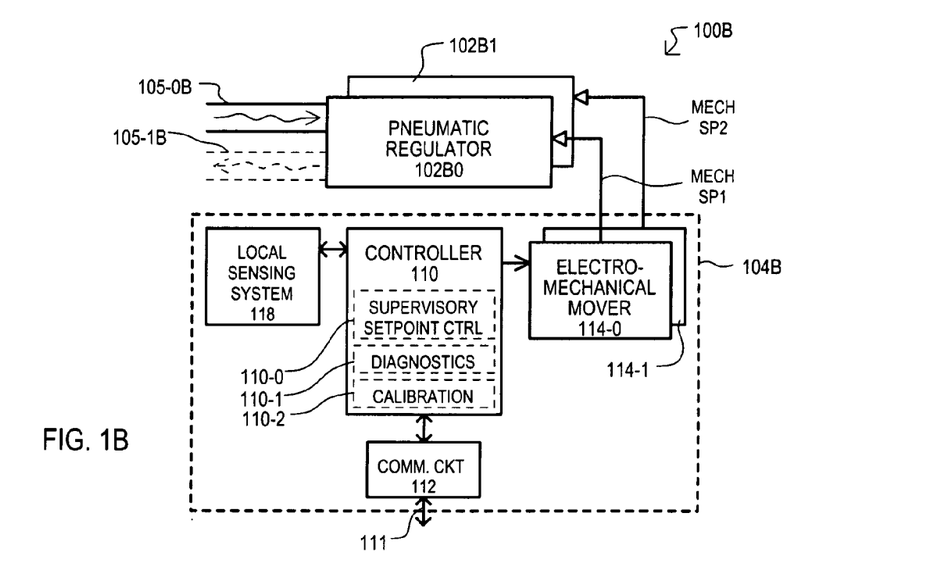

Referring now to FIG. 1B, a control device according to an alternate embodiment is shown in a block schematic diagram, and designated by the general reference character 100B. A control device 100B may differ from the particular embodiment shown in FIG. FIG. 1A in that it may include multiple pneumatic regulator sections 102B0 and 102B1. As but one example, each pneumatic regulator section (102B0 and 102B1) may provide a control output for a different purpose (e.g., one for heating, one for cooling). It is understood that pneumatic regulator section 102B1 may include its own corresponding gas flow inlet, and optionally a gas flow outlet (not shown in FIG. 1B).

Correspondingly, an electromechanical control section 104B may provide a different mechanical input to each different pneumatic regulator section (102B0 and 102B1). In the particular embodiment of FIG. 1B, electromechanical control section 104B may apply a first mechanical setpoint (MECH SP1) to pneumatic regulator section 102B0, and apply a second mechanical setpoint (MECH SP2) to pneumatic regulator section 102B1.

In the very particular example of FIG. 1B, an electromechanical control section 104B may include a controller circuit 110, communication circuit 112, electromechanical movers 114-0 and 114-1, and a local sensing system 118. A controller circuit 110 may be in electrical communication with communication circuit 112, electromechanical movers 114-0/1 and local sensing system 118.

A controller circuit 110 may execute predetermined functions in response to predetermined input signals. As but a few examples, a controller circuit 110 may include any of: a supervisory setpoint controller 110-0, a diagnostics manager 110-1, and a calibration controller 110-2. Such functions will be described in more detail below. In particular embodiments, a controller circuit 110 may also receive manual input values entered by a user into the control device via an input interface (e.g., buttons, touch pad, dial etc.).

A communication circuit 112 may provide input data to controller that is received on a connection 111. For example, communication circuit 112 may provide input setpoint values. Such values may be translated into control inputs to prime movers, to thereby generate a mechanical input in response to a received control value. A connection 111 may be a wired communication link or a wireless communication link. Thus, a communication circuit 112 may include at least a receiver for receiving data. In addition, a communication circuit 112 may transmit data as determined by control signals/data received from controller circuit 110. Accordingly, a communication circuit 112 may also include a transmitter. In a very particular embodiment, a communication circuit 112 may include a wireless transceiver.

Electromechanical movers 114-0/1 may generate a mechanical output in response to control inputs from controller circuit 110. A mechanical output from an electromechanical mover may generate, directly or indirectly (by way of some mechanical linkage, for example), an applied setpoint to a corresponding pneumatic regulator section 102B0/1. Particular examples of electromechanical movers will be described in more detail below in conjunction with other embodiments.

A local sensing system 118 may sense or otherwise make a determination regarding one or more conditions of a zone corresponding to the control device 100B. Such a zone may be an area proximate to the control device. As but a few of the many possible examples, a local sensing system may sense any of: zone temperature, zone occupancy, or zone time. Such values may be forwarded to controller circuit 110. In response to such values, a controller circuit 110 may make a determination (e.g., zone is occupied or not, etc.).

In addition or alternatively, a local sensing system 118 may make a determination regarding a zone condition itself, and forward such a determination result to a controller circuit 110. Controller circuit 110 may then transmit such a value by way of communication circuit 112. In this way, a control device 100B may monitor a corresponding zone.

Referring still to FIG. 1B, a supervisory setpoint controller 110-0 may provide control signals for activating electromechanical movers 114-0/1. For example, in response to setpoint data, supervisory setpoint controller 110-0 may generate signals that induce a movement in electromechanical movers 114-0/1. That is, as setpoint data varies, movement in electromechanical movers 114-0/1 may vary correspondingly. Supervisory setpoint controller 110-0 may opt between different setpoint values based on other conditions, such as time of day, or values provided by local sensing system (e.g., occupancy). That is setpoint data may vary according to zone time and/or condition. Further, while a controller circuit 110 may receive manual setpoint values, a supervisory setpoint controller 110-0 may override such values based on predetermined criteria (e.g., limits, time of day, time or year, outside temperature, etc.).

A diagnostics manager 110-1 may diagnose an improper control device 102B operating condition. In particular embodiments, a diagnostics manager 110-1 may monitor various values of a control device and diagnose an error condition if such values are outside a given range. As but a few examples, a diagnostics manager may monitor a pressure a gas inlet (e.g., 105-0B) or outlet (e.g., 105-1B), an electrical power level, a status of connection 111 (signal strength, etc.). In addition or alternatively, a diagnostics manager 110-1 may make diagnoses based on operating responses of a control device 100B. That is, a control device 102B response (or response of a monitored zone) may be compared to an expected response to determine if an error should be diagnosed. More particular examples of such operations will be described below in conjunction with other embodiments.

A calibration controller 110-2 may calibrate a control device 100B to account for changes (e.g., drift) in the response of the device. As but one example, the control signals output from a controller circuit 110 in response to input setpoint values can be changed, to ensure a generated response from electromechanical mover(s) 114-0/1 results in a desired response from a corresponding pneumatic regulator section 102B0/1. More detailed examples of calibration operations will be described below in conjunction with other embodiments.

In this way, a control device may include an electromechanical control section that may receive setpoint values via a communication path, and translate such values into a mechanical output that forms an applied setpoint to a pneumatic regulator section. The pneumatic regulator section can generate a pneumatic control output in response to the applied setpoint(s). Supervisory, diagnostic and/or calibration may be performed automatically.

Figure 2:
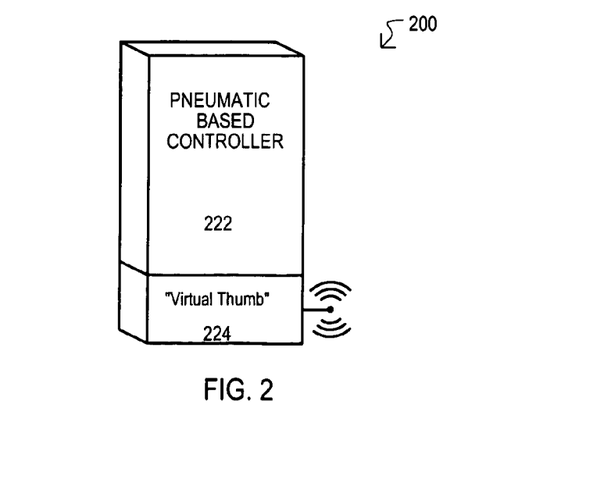
FIG. 2 is a diagram showing a control device according to another embodiment.

Referring now to FIG. 2, a control device 200 according to an embodiment is represented in a general perspective view. A control device can be conceptualized as including a pneumatic based controller portion 222 as well as a "virtual thumb" portion 224. A pneumatic base controller portion 222 may include a pneumatic regulator section, like those shown in the various embodiment herein, and equivalents. A virtual thumb portion 224 may include an electromechanical control section, like those shown in the various embodiments, and equivalents. Portion 224 may be conceptualized as a "virtual thumb" as it may provide a mechanical adjustment to a pneumatic controller (such as that which could be performed by a human thumb) in response to control values, such as setpoint values. FIG. 2 shows virtual thumb as having a wireless transmitter, however, it is understood that other embodiments may have a wired connection to one or more other devices.

Figure 3:
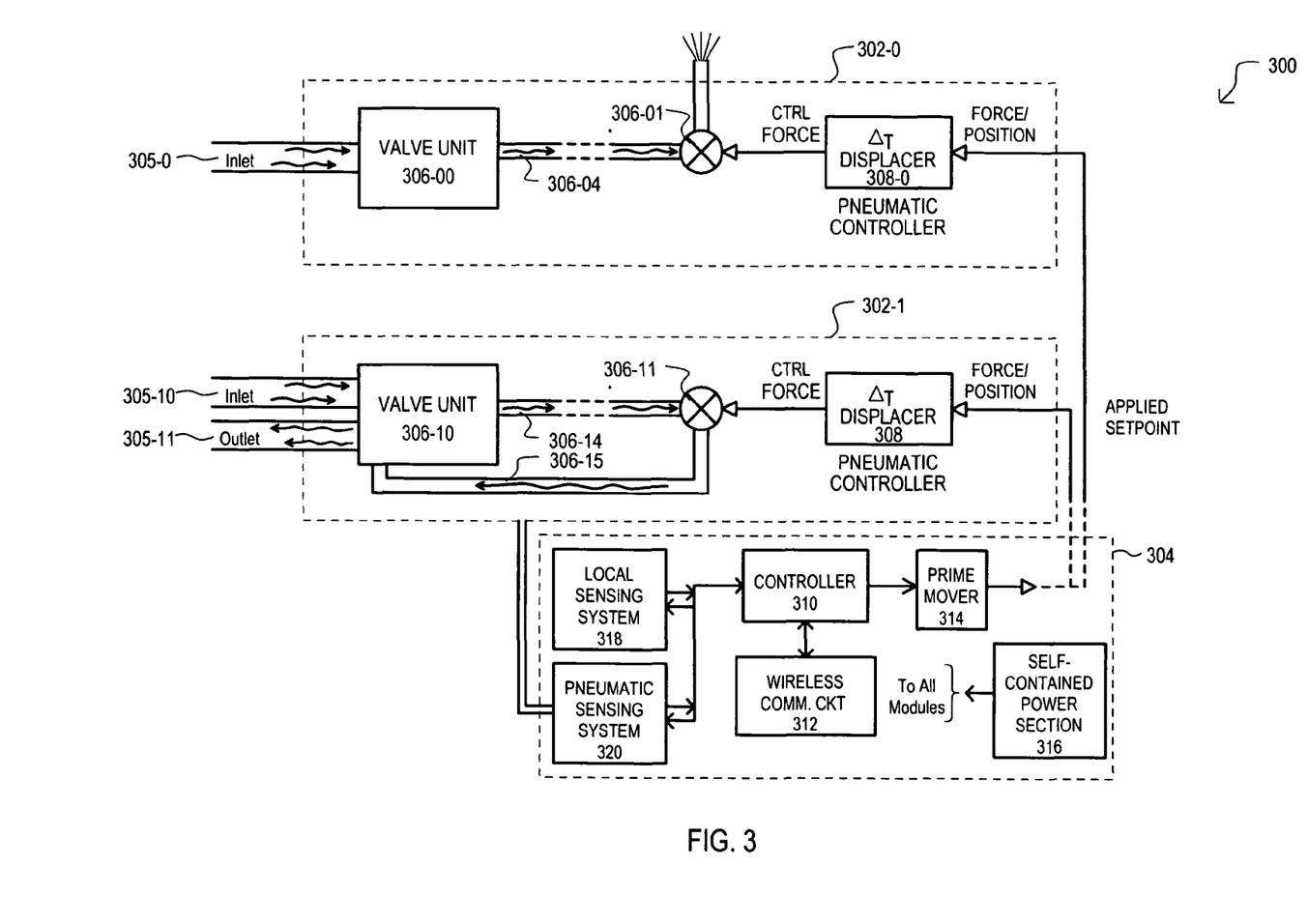
FIG. 3 shows a block schematic diagram of a control device according to a further embodiment.

Referring now to FIG. 3, a control device according to another embodiment is shown in a block schematic diagram, and designated by the general reference character 300. Control device 300 differs from that of FIGS. 1A and 1B in that a pneumatic regulator section may be a temperature dependent pneumatic controller. Further, two examples are shown: a "single pipe" pneumatic regulator section 302-0 and a "dual pipe" pneumatic regulator section 302-1. It is understood that either such pneumatic regulator (302-0 or 302-1) may be included in control device 300.

A pneumatic controller (302-0/1) may receive an applied setpoint as a force and/or position, and in response, vary a gas pressure. Single pipe pneumatic regulator section 302-0 may include a valve unit 306-00, a "flapper" 306-01, and a temperature dependent (ΔT) displacer 308. A valve unit 306-00 may receive an inlet flow of a gas at a gas flow inlet 305-0. All or a portion of the inlet flow may be applied to flapper 306-01 by way of flapper input 306-04. In response to a control force (or position) provided by ΔT displacer 308-0, flapper 306-01 can vary an amount of inlet gas vented to another location (e.g., to the atmosphere). Thus, a pressure at gas inlet 305-0 may vary in response to a control force/position from ΔT displacer 308-0.

A ΔT displacer 308 may translate an applied setpoint into a control force or position. Such a translation may vary according to temperature. That is, as temperature increases, a proportional amount of displacement/force generated may increase (or decrease), and vice versa.

In case of a dual pipe pneumatic regulator section 302-0, a valve unit 306-10 may receive an inlet flow of a gas at a gas inlet 305-10 and provide an output flow at an outlet 305-11. In addition, a portion of an inlet flow may be applied to flapper 306-11 by way of flapper input 306-14. In response to a control force (or position) provided by ΔT displacer 308-1, flapper 306-11 can vary a pressure at flapper output 306-15. A pressure at gas outlet 305-11 may vary in response to that at flapper output 306-15.

Referring still to FIG. 3, in the embodiment shown, within electromechanical control section 304 a communication circuit 312 may particularly be a wireless communication circuit, and thus may include a wireless receiver and transmitter and/or a wireless transceiver. In addition, an electromechanical mover 314 may be a prime mover, initiating an initial mechanical action that results in the application of the setpoint to a pneumatic regulator section (302-0 or 302-1).

An electromechanical control section 304 may further include a pneumatic sensing system 320 and a self-contained power supply 316. A pneumatic sensing system 320 may sense a gas pressure at one or more locations of a pneumatic regulator section 302-0 or 302-1. Such a sensed pressure may allow diagnostic and calibration functions to be based on one or more such flow values.

A self-contained power section 316 may provide power to electromechanical control section 104. A power section 316 may be considered self-contained as it may not be dependent upon a power supply wiring of a site at which the control device 300 is deployed. That is, in particular embodiments, a control device 300 may be installed with mechanical fittings/connections and not a power supply wiring.

In this way, in particular embodiments, a pneumatic temperature controller responsive to a mechanical input can be controlled by an electromechanical control section that receives control information via a wireless connection.

Figure 4:
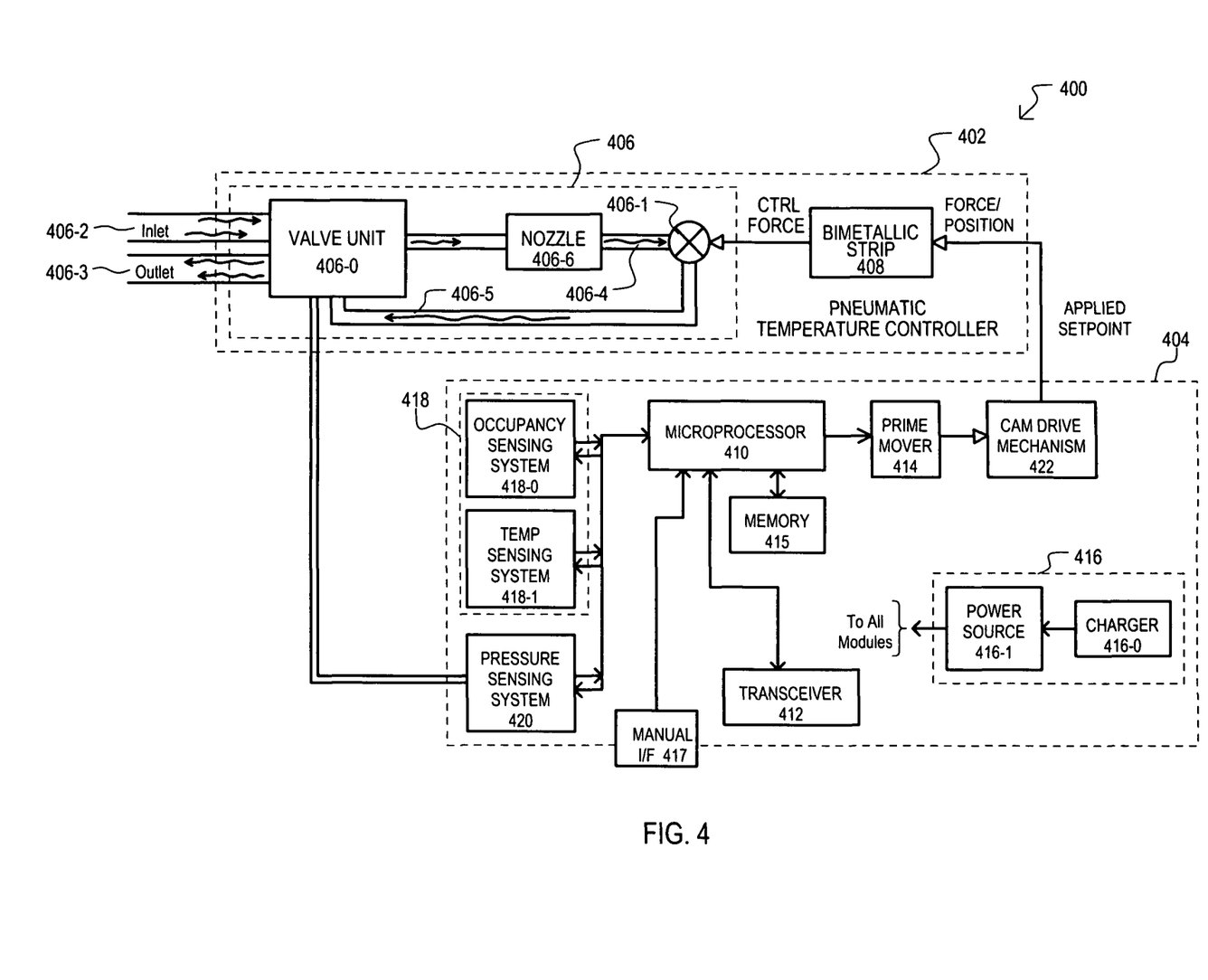
FIG. 4 is a block schematic diagram of a wireless pneumatic thermostat (WPT) device according to an embodiment.

Referring now to FIG. 4, a control device according to a further embodiment is shown in a block schematic diagram, and designated by the general reference character 400. A control device 400 may be a wireless pneumatic thermostat (WPT) device. While FIG. 4 shows a dual pipe type pneumatic regulator section, it is understood the embodiment could alternately include a single pipe regulator section.

A pneumatic regulator section 402 differs from that of FIG. 3 in that a ΔT displacer 408 may include a bimetallic strip. A bimetallic strip 408 may include two or more materials (in this case metals) having different thermal coefficients of expansion. Consequently, a control force/position output in response to a received applied setpoint may vary according to an ambient temperature of control device 400. Further, a pneumatic output driver 406 may include a nozzle 406-6 for controlling or establishing a pressure applied to flapper 406-1 at flapper input 406-4.

An electromechanical control section 404 differs from that of FIG. 3 in a number of ways. First, a prime mover 414 may be mechanically coupled to pneumatic controller 402 by a cam drive mechanism 422. This may enable a linear mechanical motion to be translated into a rotational motion, or vice versa. Second, electromechanical control section 404 also includes a transceiver 412 as a wireless communication circuit, and a microprocessor 410 as a controller circuit. A microprocessor 410 may be connected to a memory 415. A memory 415 may store instructions for execution by a microprocessor 410 for executing any of: setpoint supervisory functions, diagnostic functions, or calibrations described herein, or equivalents. A memory 410 may be volatile and/or nonvolatile memory, and in particular embodiments may include nonvolatile memory for storing routines. As but a few possible examples, a microprocessor may be, or may be part of a PsoC(TM) mixed signal controller manufactured by Cypress Semiconductor Corporation of San Jose, Calif., U.S.A., or a processor having a ARM architecture, a PIC microcontroller manufactured by Microchip Technology Inc., of Chandler, Ariz., U.S.A., or other microcontrollers, such as those based on the 8051 architecture developed by Intel Corporation.

Electromechanical control section 404 can further differ from that of FIG. 3 in that a local sensing system 418 may include an occupancy sensing system 418-0 and a temperature sensing system 418-1. In response to requests from microprocessor 410, occupancy sensing system 418-0 may provide data from which a determination may be made as whether or not a zone corresponding to WPT device 400 is to be considered occupied. Such a feature may allow HVAC power/resources to be conserved when a zone is not occupied. In response to requests from microprocessor 410, a temperature sensing system 418-1 may sense an ambient temperature of WPT device 400 (e.g., a zone temperature). Such a feature may allow a WPT device 400 to be calibrated remotely when an applied setpoint does not correspond to a desired ambient temperature.

In addition, electromechanical control section 404 may include a manual interface 417 that can enable a user to manually enter data values, such as setpoint values. This can enable local control of control device 400, which may be selectively overridden by electromechanical control section 404.

Referring still to FIG. 4, a pressure sensing system 420 may sense an inlet pressure from inlet flow 406-2, to thereby diagnose a problem with a pneumatic control input provided to WPT device 400.

Electromechanical control section 404 further shows a self-contained power section 416 that includes a charger 416-0 and a power source 416-1. A charger 416-0 may harness conditions of the environment of a WPT device 400 to generate electrical energy. Such electrical energy may be provided to a power source 416-1. A power source 416-1 may provide electrical energy to the various modules of setpoint controller 404.

In this way, a wireless pneumatic thermostat may have a pneumatic regulator section that may provide a gas flow output, that may be controlled with wireless commands, and that may sense occupancy and temperature of a corresponding zone.

Figures 5A, 5C:
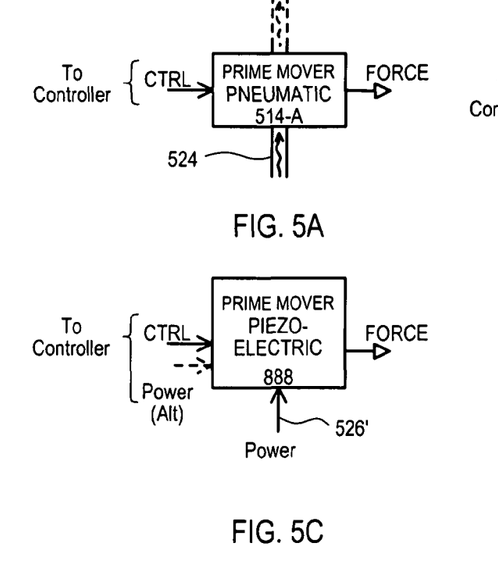
FIGS. 5A to 5C are block diagrams of prime movers that may be included in the embodiments.
Figure 5B:
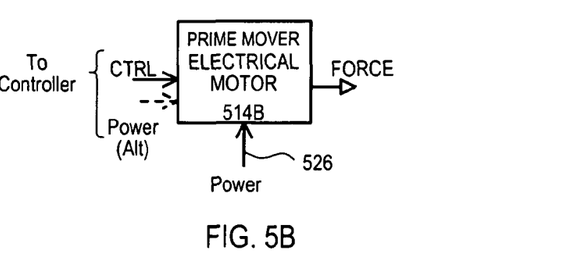

Referring to FIGS. 5A to 5C, various particular examples of prime movers are shown in block schematic diagrams. Such prime movers may correspond to any of those shown as 114, 314 or 414.

Referring to FIG. 5A, a prime mover 514-A may include a pneumatic motor. Prime mover 514-A may receive control values CTRL from a controller circuit (e.g., 110, 310, 410), and in addition, a pressure from a gas input 524. In response to control values CTRL, prime mover 514-A may convert pressure from gas input 524 into a mechanical output, such as a force or change in position. In one particular arrangement, a pressure from gas input 524 may be taken from an inlet flow of a control device, like that shown as 306-2 and/or 406-2.

Referring to FIG. 5B, a prime mover 514-B may include an electrical motor. Prime mover 514-B may receive control values CTRL from a controller circuit (e.g., 110, 310, 410), and in addition, electrical power may be received at a power input 526 from self-contained power section 516. In response to control values CTRL, prime mover 514-B may generate a mechanical output (e.g., force, linear movement, rotational movement). Alternately, depending upon the amount of electricity needed to generate a desired mechanical output, electrical energy needed by prime mover 514-B may be provided from a controller circuit itself.

Referring to FIG. 5C, a prime mover 514-C may include a piezoelectric device. Prime mover 514-C may receive control values CTRL from a controller circuit (e.g., 110, 310, 410), and in addition, electrical power may be received at a power input 526' from self-contained power section 516. In response to control values CTRL, a voltage may be applied to a piezoelectric material causing prime mover 514-C may alter its shape. As in the case of the electrical motor, depending upon the amount of electricity needed to generate a desired mechanical output, electrical energy needed by prime mover 514-C may be provided from a controller circuit.

Of course the above are but a few examples of possible prime movers. Further, alternate embodiments may include prime movers composed of combinations of the above.

Figure 6A:
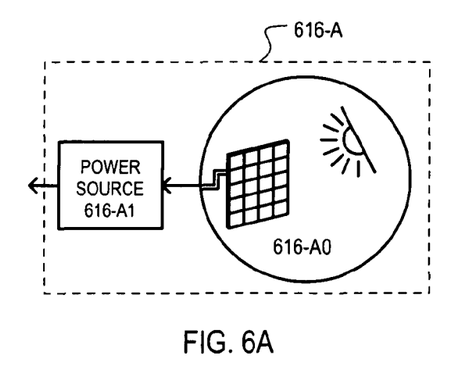
FIGS. 6A to 6D are block diagrams of self-contained power sections that may be included in the embodiments.
Figure 6B:
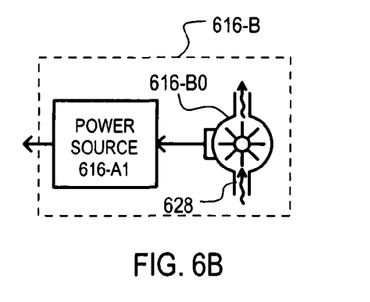
Figure 6C:
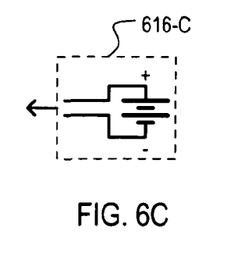

Referring to FIGS. 6A to 6C, various particular examples of self-contained power sections are shown in block schematic diagrams. Such power sections may be included in embodiments shown above, or equivalents.

Referring to FIG. 6A, a power section 616-A may include a charger 616-A0 that includes one or more photovoltaic cells. Thus, a power section 616-A may be charged in response to light present at the zone corresponding to a control device. Such electrical energy may be stored (e.g., in a battery), regulated, and/or applied directly by power source 616-A1.

Referring to FIG. 6B, a power section 616-B may include a turbine 616-B0. Thus, a power section 616-B may be charged in response to a pressurized material received at a turbine inlet 628. In one particular arrangement, a pressure for turbine inlet 628 may be taken from an inlet flow of a control device, like that shown as 306-2 and/or 406-2. Electrical energy generated by turbine 616-B0 may be stored, regulated, and/or applied directly by power source 616-B1.

Referring to FIG. 6C, a power section 616-C may include a battery.

Figure 6D:
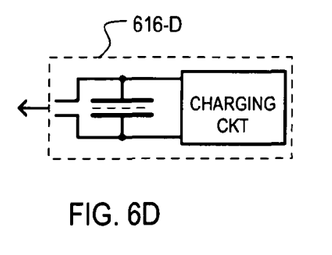

Referring to FIG. 6D, a power section 616-D may include a "supercapacitor", such as an electrochemical double layer capacitor. Such a capacitor may be charged according to techniques noted above, or other conventional techniques.

Of course the above are but a few examples of possible self-contained power sections. Further, alternate embodiments may include power sections composed of combinations of the above.

Figure 7:
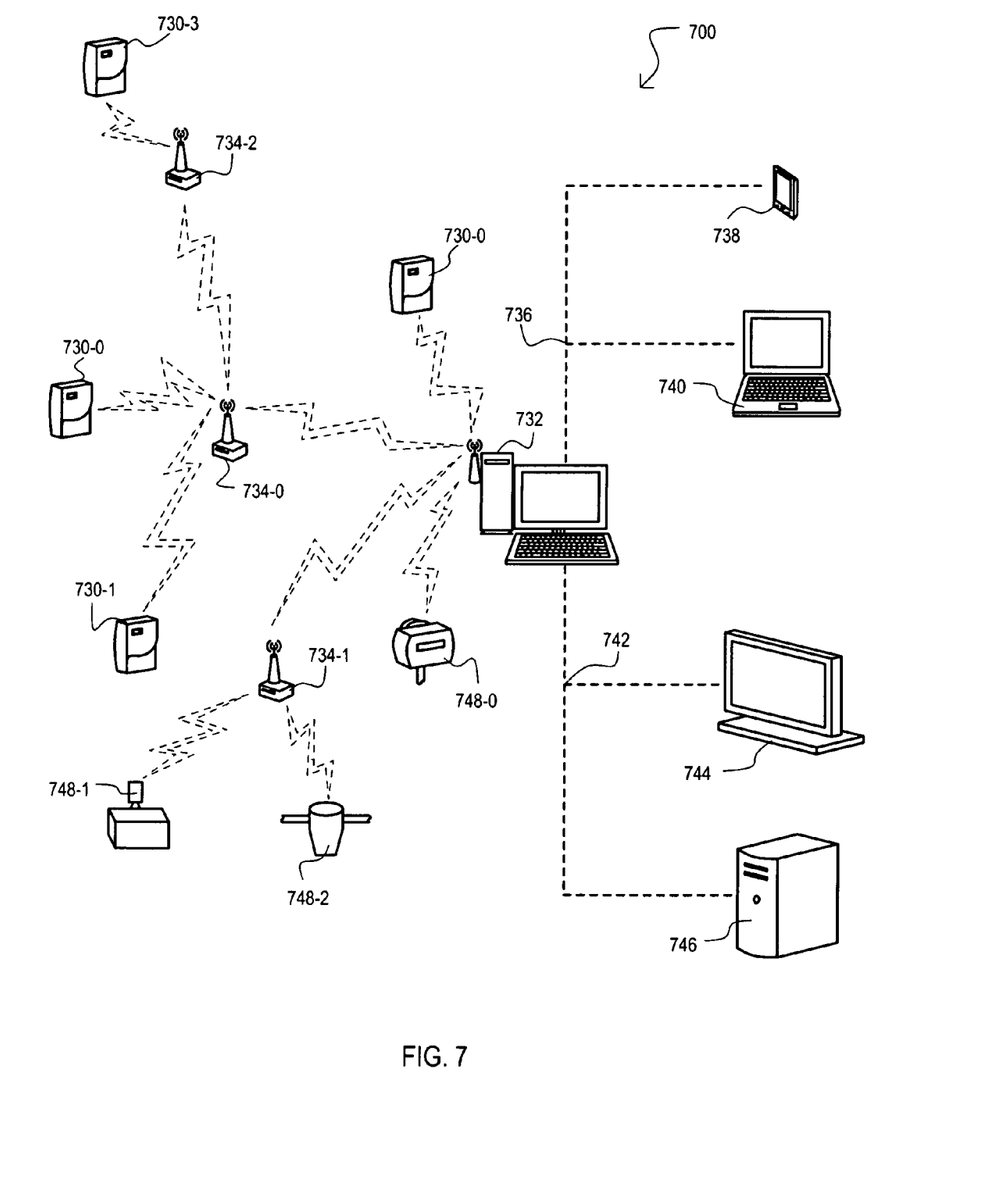
FIG. 7 is a diagram showing systems and system components according to embodiments.

While the above embodiments have shown various control devices, alternate embodiments may include control systems. Examples of such systems are shown in FIG. 7. It is noted that while FIG. 7 shows an example of a wireless network, alternate embodiments may include wired connections between all or a portion of the system components.

Referring to FIG. 7, a system may include one or more control devices according to the embodiments described herein, or equivalents, and a master device. The particular embodiment of FIG. 7 includes four control devices 730-0 to 730-3, a master device 732, and a repeater 734-0. Control devices (730-0 to 730-3) may include any of the control devices shown herein, or equivalents, and in the particular embodiment of FIG. 7, may be wireless pneumatic thermostat (WPT) devices. Control devices (730-0 to 730-3) may receive data from (e.g., input setpoint data) and provide data to (e.g., ambient temperature, occupancy status, diagnoses of control device, or mechanical inputs to such control devices) master device 732 over a wireless connection.

A master device 732 may include a processor and control and monitoring tools executable by such a processor. In the very particular example shown, a master device may be a personal computer, or equivalent, with a wireless transceiver.

Optionally, in the event a control device (730-0 to 730-3) is positioned outside of a direct wireless range with respect to master device 732, one or more repeaters may be included that may amplify and retransmit signals between a master device 732 and a control device. In the embodiment of FIG. 7, control device 730-0 may have a direct wireless connection with master device 732. In contrast, control devices 730-1 and 730-2 have a wireless connection with master device 732 through repeater 734-0. Multiple repeaters may be used to increase distance even further. In the example of FIG. 7, control device 730-3 may have a wireless connection with master device 732 through repeaters 734-2 and 734-0. In other embodiments, more than two repeaters may be used to connect a control device with a master device.

In this way, a network of control devices, such as wireless pneumatic thermostats may be monitored and/or controlled with master device over a direct wireless connection or through one or more signal repeaters.

In a particular embodiment, a master device 732 may further be accessed by one or more other monitor/control devices. For example, a master device 732 may be connected to, and accessible from a network 736. Such a network may include a local area network or wide area network, as but two examples. In the particular embodiment shown, a handheld device 738, which may include a cell phone, and personal computer (e.g., laptop or desktop) 740 may access master device 732, and thereby control and/or monitor control devices (730-0 to 730-3). In addition or alternatively, a master device 732 may be connected by a communication path 742 to an Internet access device 744, or may be connected to a building management system 746. In such an arrangement, control devices (730-0 to 730-3) may be monitored and/or controlled by an Internet application (such as a World Wide Web service), or an existing building management system.

In a particular embodiment, a system 700 may include other wireless devices in addition to control devices (730-0 to 730-3). FIG. 7 shows other wireless devices 748-0 to 748-2 be connected to master device 732 directly, or by way of one or more repeaters (e.g., 734-1). As but a few examples, other wireless devices may include, but not be limited to, wireless gauge readers, wireless battery monitors, or wireless steam trap monitors.

In the case of a wireless network, communications between devices may be via a mesh network according to a suitable standard, including CyFi(TM), promulgated by Cypress Semiconductor Corporation, Wi-Fi, or ZigBee. A master device 732 may be a server running a Windows®, Linux type or other operating system, including SQL type applications. Further, such a server may include a BACnet type interface for communications with a BACnet type system.

While the embodiments may include devices and systems, other embodiments may include various methods.

Figure 8:
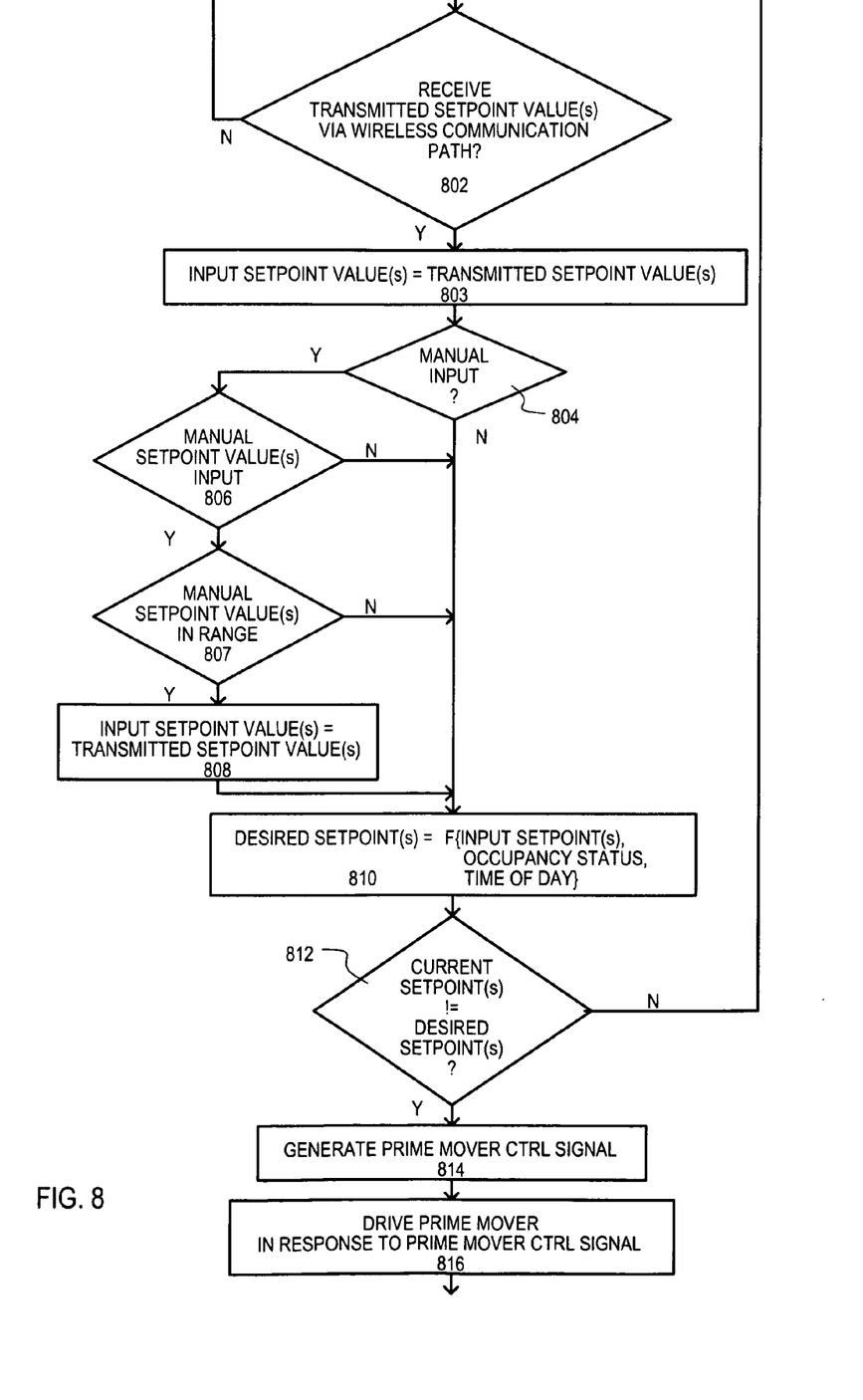
FIG. 8 is a flow diagram of a method according to an embodiment.

Referring to FIG. 8, a method according to a first embodiment is shown in flow diagram and designated by the general reference character 800. A method 800 may include determining if one or more transmitted setpoint values are received via a wireless connection (box 802). In particular examples, this may include receiving input setpoint values from a master device over a wireless connection either directly, or by way of one or more repeaters.

If transmitted setpoint values have been received (Y from box 802), a method 800 may also include setting input setpoint value(s) to the received set point value(s) (box 803). In this way, a setpoint for a control device may be set wirelessly.

The particular method 800 also includes the ability to input setpoints manually. Thus, if a manual input is received (Y from box 804), such manual input values may be examined to determine if they are within an acceptable range. If such values are within a range (Y from box 807), input set point value(s) may be updated to the manually input value (box 808). If such values are not within a range (N from box 807), such values are not utilized as input setpoint values.

A method 800 may generate a desired setpoint value (box 810) based received setpoint values (e.g., received wirelessly or entered manually). In the embodiment shown, a desired setpoint value may be function of any or all of: input setpoint value(s), an occupancy status, and/or a time of day.

If current setpoint value(s) are not equal to desired setpoint value(s) (Y from box 812), a prime mover control signal may be generated (box 814). A prime mover position may be moved in response to the prime mover control signal (box 816).

In this way, a method may cause prime mover to induce a mechanical action in response to transmitted setpoint values.

Figure 9:
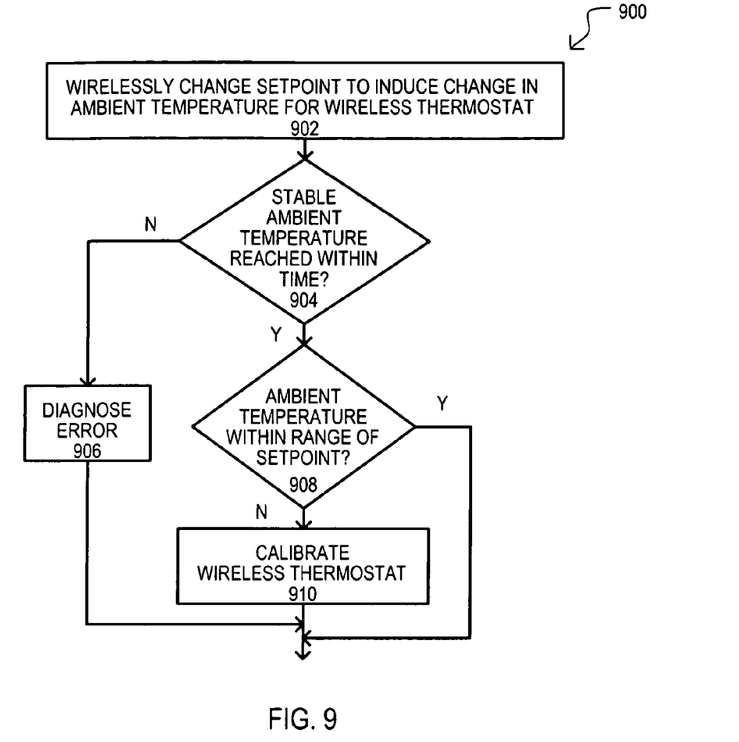
FIG. 9 is a flow diagram of a method according to another embodiment.

Referring now to FIG. 9, a method according to another embodiment is shown in a flow diagram and designated by the general reference character 900. A method 900 may include wirelessly changing a setpoint value to induce a change in ambient temperature for a wireless thermostat (box 902). If a stable ambient temperature is not reached in time (N from box 904), an error may be diagnosed (box 906). If a stable ambient temperature is reached within a period (Y from box 904), an ambient temperature may be checked to determine if it is within a range of the setpoint (box 906). If an ambient temperature is not within range of a setpoint (N from box 908), the wireless thermostat may be calibrated (box 910).

In this way, a wireless thermostat may diagnose errors and calibrate itself.

Figure 10:
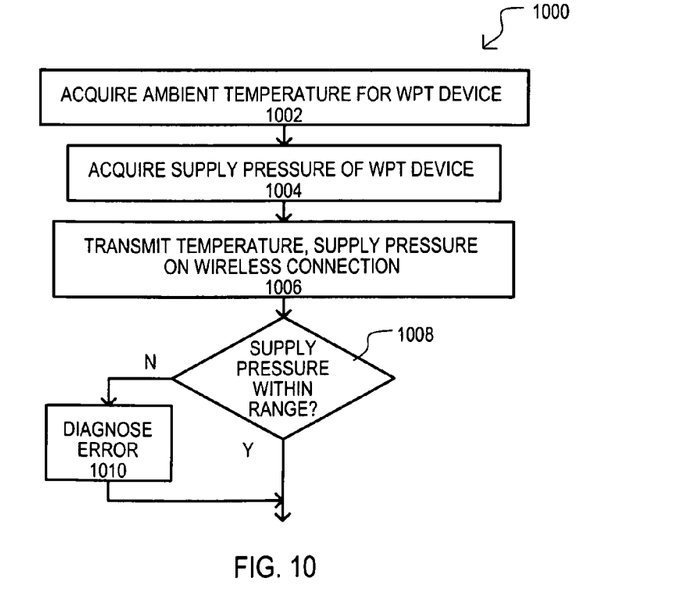
FIG. 10 is a flow diagram of a method according to a further embodiment.

Referring to FIG. 10, a method according to another embodiment is shown a flow diagram and designated by the general reference character 1000. A method 1000 may include acquiring an ambient temperature for a wireless pneumatic thermostat (WPT) device (box 1002). A supply pressure for a WPT device may then be acquired (box 1004). Such actions may include sensing systems of the WPT device determining the ambient temperature and a pressure of a gas supplied to the WPT device. A method 1000 may also include transmitting temperature and supply pressure values on a wireless connection (box 1006).

In the particular method 1000 shown in FIG. 10, a supply pressure value may then be utilized to diagnose an error. If a supply pressure is not within a range (N box 1008) an error may be diagnosed (box 1010). Such an action may include a master device comparing a received supply pressure value to predetermined limit(s). Alternatively, such a determination may be made within a WPT device, such as with a controller circuit, as but one example.

In this way, a wireless pneumatic thermostat may wireless transmit data including an ambient temperature and a supply pressure. A supply pressure value may be used to diagnose an error.

As noted above, wireless pneumatic thermostat (WPT) device embodiments may include a mechanical controller and a self-contained power section. Such a mechanical controller may be compatible with existing fittings at a site. Further, because a WPT device may have a self-contained power section, WPT device embodiments may be installed in lieu of existing pneumatic thermostats without having to rewire the site to provide a power supply input. One very particular example of an installation of a WPT device according to an embodiment is shown in FIGS. 11A to 11D.

Figure 11A:
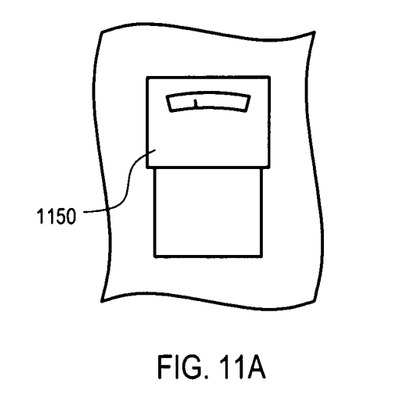
FIGS. 11A to 11D are diagrams showing a method of replacing an existing pneumatic thermostat with a WPT device.

Referring to FIG. 11A, an existing pneumatic thermostat 1150 may be installed at a site location. Such a pneumatic thermostat 1150 may be a purely pneumatic device, and not receive electrical power, nor include wiring for electrical power.

Figure 11B:
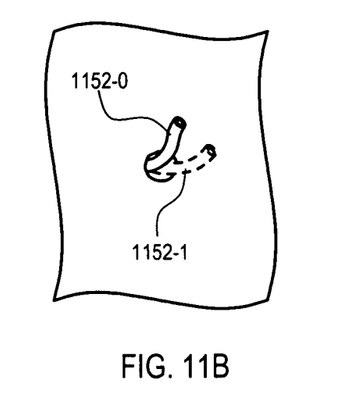

Referring to FIG. 11B, existing pneumatic thermostat 1150 may be removed. At the location, pneumatic connections 1152-0 and 1152-1 may remain. It is noted that in other configurations, but one pneumatic connection may be present. Accordingly, pneumatic connection 1152-1 is shown with dashed lines.

Figure 11C:
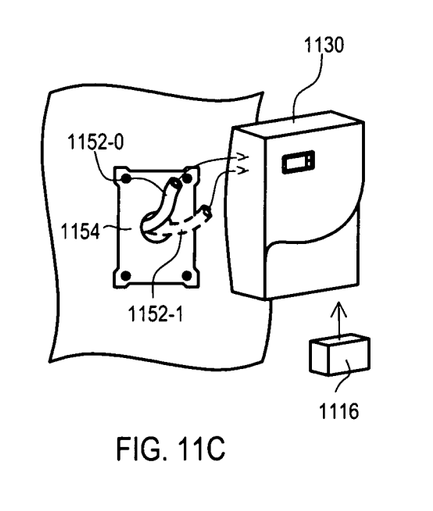

Referring to FIG. 11C, optionally if a similar feature is not available at the site, a mounting plate 1154 may be attached. A WPT device 1130, according to any of the embodiments shown herein or equivalents, may be connected to the existing pneumatic line(s) (1152-0 and 1152-1). A self-contained power supply 1116 may be installed for the WPT device 1130. A self-contained power supply 1116 may take the form of any of those shown herein, or equivalents. WPT device 1130 may then be attached (e.g., fixed to mounting plate 1154).

Figure 11D:
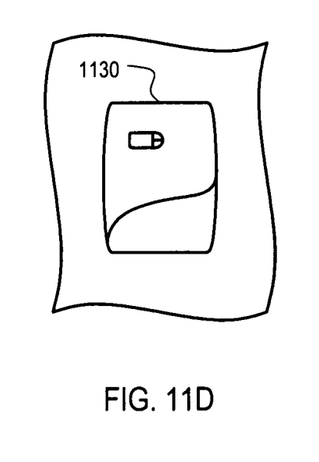

FIG. 11D shows WPT device 1130 installed in place of an existing pneumatic thermostat. Unlike an existing pneumatic thermostat, WPT device 1130 may enable wireless control and monitoring of a zone. Further, a power supply wiring or communication wiring may be omitted for cost effective automation with little disruption to operations at the site.

In this way, a WPT device according to embodiments may replace an existing pneumatic thermostat and may not include power supply wiring or communication wiring. Thus, such an installation may be done at relatively low cost and with minimal disruption at the installation site.

Figure 12:
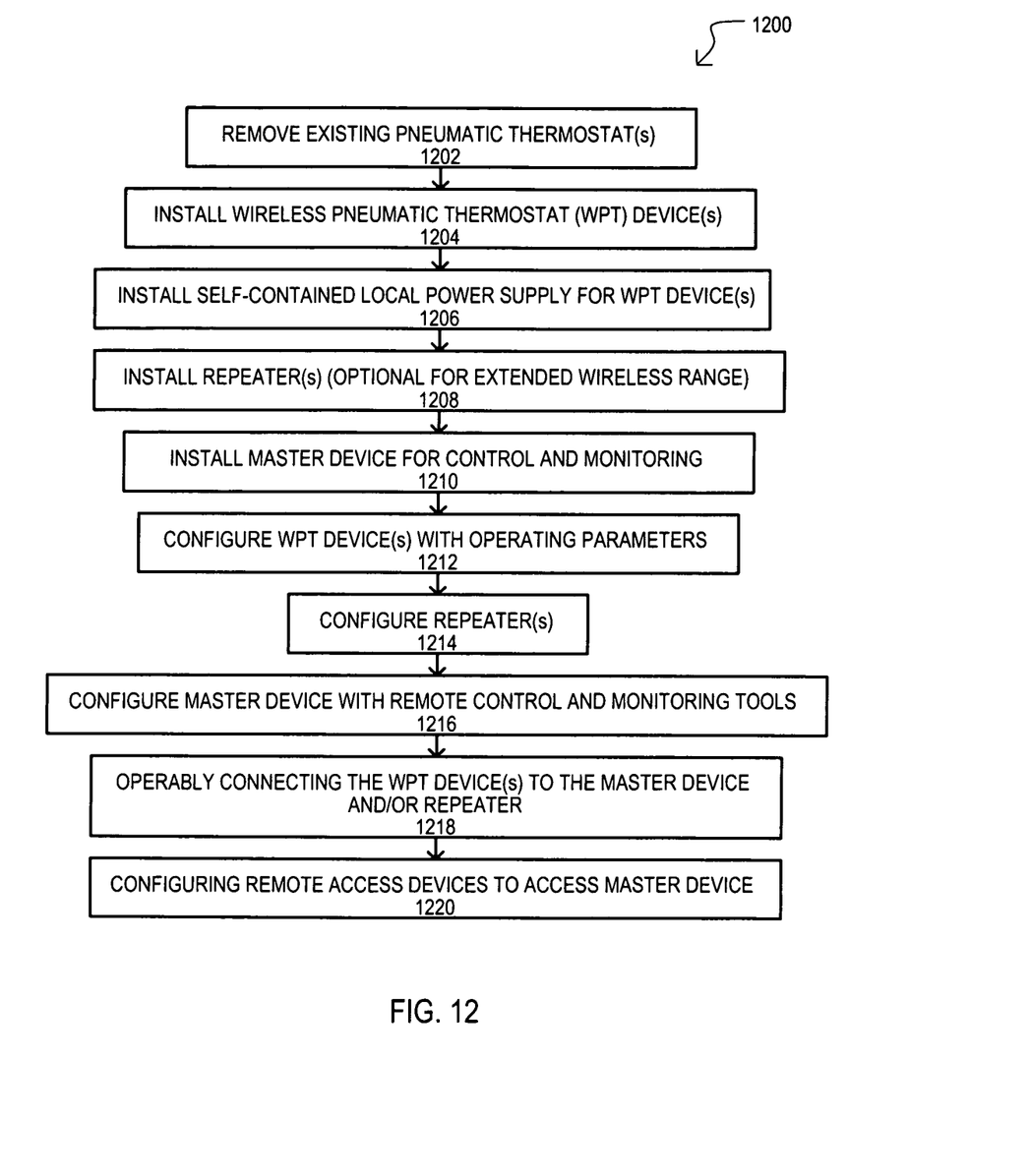
FIG. 12 is a flow diagram of a method according to yet another embodiment.

While FIGS. 11A to 11D show replacement of a single existing pneumatic thermostat, other embodiments may include replacing an entire site of such existing pneumatic thermostats with WPT devices, to thereby automate the site. One very particular example of such an embodiment is shown in FIG. 12. The method shown in FIG. 12 may be used to create systems like those described in conjunction with FIG. 7, or equivalents.

Referring to FIG. 12, a method 1200 may include removing existing pneumatic thermostat(s) (box 1202). Wireless pneumatic thermostat (WPT) device(s), according to any of the embodiments shown herein, or equivalents, may then be installed (box 1204). Self-contained local power supplies may then be installed for WPT device(s) (box 1206). In very particular embodiments, such actions may include those shown in FIGS. 11A to 11D.

If WPT device(s) are outside of a wireless range for a master device, one or more repeaters may be installed (box 1208). A master device may be installed (box 1210). Such a master device may be for controlling and monitoring WPT device(s) wirelessly.

Various components of a system may then be configured. WPT device(s) may be configured with operating parameters (box 1212). Such operating parameters may include initial setpoints as well as communication settings for communicating wirelessly with a master device, either directly, or via one or more repeaters. Any repeater(s) may be configured (box 1214). Such an action may include configuring repeaters to amplify and retransmit communication signals between a master device and WPT devices.

The very particular example of FIG. 12 includes a master device being configured with remote control and monitoring tools (box 1216). Such an action may include configuring a master device to communicate with one or more other devices at a location remote from the master device.

With various system components at a site (WPT device(s), master device, and any repeater(s)) installed, WPT device(s) may be operably connected to the master device and/or any repeater(s) (box 1218). Such an action may include assigning device identification values and communication channels to the control devices.

In the embodiment shown, a method 1200 may further include configuring remote access devices to access a master device (box 1220). Such an action may include configuring a remote access device (e.g., hand held device, other computers, or other enterprise systems) to access a master device (i.e., via a web page or other protocol). This may enable installed WPT device(s) to be monitored and controlled with such remote access devices.

In this way, a site having existing pneumatic thermostats may be refitted with WPT devices to automate such a site.

Embodiments of the invention may be remotely controlled by a communication path. This is in contrast to pneumatic devices that only include manual inputs.

Embodiments of the invention may also be programmable, allowing operations to be controlled based not only upon one or more setpoints, but also based upon zone or other conditions.

Embodiments of the invention may include one or more diagnostic functions that may determine if a control device and/or pneumatic system to which a control device is attached, is operating in a desired fashion. This is in contrast to pneumatic devices that only provide a pneumatic control value and may leave problems undiagnosed until detected by personnel.

Embodiments of the invention may include self-calibration capabilities and/or routines. This is in contrast to pneumatic devices that require manual calibration or re-calibration.

Embodiments of the invention may allow for easy and/or rapid conversion of existing pneumatic control systems to direct digital control (DDC). In such conversions, labor costs may be lower than other retrofit methods, as electrical wiring may not have to be run, pneumatic piping may not be removed, and/or actuators may not have to be changed. Second, DDC conversions utilizing embodiments of the invention may have lower material costs, as compared to those with other control devices (i.e., those with electromechanical actuators that operate directly on a gas flow itself), and/or, as noted above, additional cabling may not be run.

DDC conversions utilizing embodiments of the invention may be less disruptive to customers. Retrofitting each pneumatic control device at a site may be done rapidly, as compared to approaches that may mandate power and other cabling be run throughout the site. Further, for embodiments that attach to existing pneumatic connections, removing existing pneumatic control devices may be accomplished with relatively little noise, and may avoid ceiling or wall deconstruction/modification work. Still further, DDC conversions utilizing the embodiments may be accomplished in a relatively clean fashion, avoiding dust, or even require abatement specialists in the case of building having asbestos, or the like.

It should be appreciated that in the foregoing description of exemplary embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention can be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A control device, comprising:
   an electromechanical setpoint controller having a prime mover that applies a setpoint force in response to a controller signal, and a controller circuit that generates the controller signal in response to setpoint control data; and
   a pneumatic controller having at least one gas flow inlet and a flow regulator that varies a gas flow property in response to the setpoint force,
   wherein the control device is a pneumatic thermostat, and the pneumatic controller further includes a temperature dependent displacer mechanically coupled to the setpoint force that provides a mechanical output to the flow regulator, the mechanical output varying in response to an ambient temperature;
   wherein the temperature dependent displacer is a bimetallic strip.

2. The control device of claim 1, wherein the prime mover is mechanically coupled to the pneumatic controller by a cam drive mechanism.

3. The control device of claim 1, wherein the prime mover is a piezoelectric device.

4. The control device of claim 1, wherein:
   the controller circuit comprises a processor that executes predetermined instructions.

5. The control device of claim 1, wherein:
   the electromechanical setpoint controller further includes the controller circuit generating the controller signal further in response to local data, and a local sensing system that generates the local data in response to conditions of a zone proximate to the control device.

6. The control device of claim 1, wherein the electromechanical setpoint controller further includes a pressure sensing system that provides a pressure data value to the controller corresponding to a pressure of an input gas flow.

7. The control device of claim 1, wherein the electromechanical setpoint controller further includes a self-contained power section that provides electrical power to at least the prime mover and controller circuit, and not to the pneumatic controller.

8. The control device of claim 7, wherein the self-contained power section includes a power source selected from the group of: a photovoltaic cell, a turbine, a supercapacitor, and a battery.

9. The control device of claim 1, further comprising a communication circuit coupled to the controller circuit for receiving setpoint control data from a location remote from the control device, and providing setpoint control data to the controller circuit.

10. The control device of claim 1 wherein the prime mover comprises a pneumatic motor, and at least a portion of the setpoint force is generated from at least a portion of an input gas flow of the gas flow inlet.

11. The control device of claim 10, wherein the prime mover is mechanically coupled to the pneumatic controller by a cam drive mechanism.

12. The control device of claim 10, wherein the electromechanical setpoint controller further includes the controller circuit generating the controller signal further in response to local data, and a local sensing system that generates the local data in response to conditions of a zone proximate to the control device.

13. The control device of claim 10, wherein the electromechanical setpoint controller further includes a pressure sensing system that provides a pressure data value to the controller corresponding to a pressure of an input gas flow.

14. The control device of claim 10, wherein the electromechanical setpoint controller further includes a self-contained power section that provides electrical power to at least the prime mover and controller circuit, and not to the pneumatic controller.

15. The control device of claim 10, further including:
   a communication circuit coupled to the controller circuit for receiving setpoint control data from a location remote from the control device, and providing setpoint control data to the controller circuit.

16. A system, comprising:
   a control device comprising a pneumatic section that varies a gas flow in response to a mechanical control input, and an electromechanical supervisory section that applies the mechanical control input to the pneumatic section in response to setpoint data; and
   a master device, coupled to the control device by a communication path, that provides the setpoint data to the control device,
   wherein the control device is a pneumatic thermostat, and the pneumatic section further includes a temperature dependent displacer that provides a mechanical output to a flow regulator, the mechanical output varying in response to an ambient temperature;
   wherein the temperature dependent displacer is a bimetallic strip.

17. The system of claim 16,
   wherein the communication path comprises a wireless connection and
   the system further comprises a repeater device that provide at least a portion of a wireless connection path between the repeater device and the control device and at least a portion of a second wireless connection path between the repeater device and the master device.

* * * * *